Oct. 16, 1945. H. S. PIPER Re. 22,683

DISPLAY FRAME

Original Filed Feb. 10, 1942

Inventor

Henry S. Piper

By Clarence A. O'Brien and Harvey B. Jacobson

Attorneys

Reissued Oct. 16, 1945

Re. 22,683

UNITED STATES PATENT OFFICE 22,683

DISPLAY FRAME

Henry S. Piper, Minneapolis, Minn., assignor of one-fourth to Irving M. Frisch and one-half to Hannah W. Piper, both of Minneapolis, Minn.

Original No. 2,316,615, dated April 13, 1943, Serial No. 430,266, February 10, 1942. Application for reissue April 22, 1943, Serial No. 484,099

4 Claims. (Cl. 40—152.1)

My invention relates to improvements in display frames for use in framing pictures, printed matter and the like, especially for window advertising display.

The principal object of the invention is to provide a frame which may be inexpensively constructed of pliable, foldable material, such as cardboard, folded to interlock with a mat so that the mat and the folded frame parts are securely held in place without the use of glue, or other adhesive means.

Another object is to provide a frame of the character and for the purposes above set forth, and a mat, which are strongly reinforced by interfolding into interlocking relation.

Still another object is to provide a frame and mat which may be quickly and easily assembled in interlocking relation and either stood upright or suspended as desired.

Other and subordinate objects are also comprehended by my invention, all of which together with the precise nature of my improvements, will be readily understood when the succeeding description and claims are read with reference to the drawing accompanying and forming part of this specification.

Figure 1:
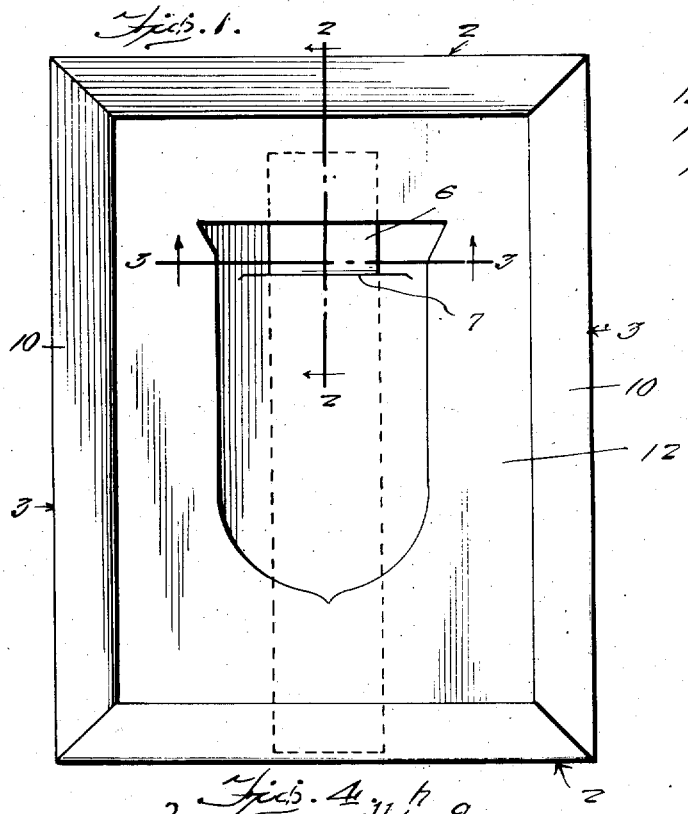
Figure 1 is a view in front elevation of a preferred embodiment of my improved frame.

Reference being had to the drawing by numerals, my improved frame as illustrated therein is preferably constructed of cardboard and in the form of a rectangle from a single piece of such material to embody a back panel 1, top and bottom ends 2, and sides 3. The back panel is cut out above its transverse center to provide a hanger tab 4 having an upper free end apertured, as at 5, for suspending the frame from a nail or the like, not shown.

A standard 6, in the form of a stiff strip of cardboard is provided for bracing the frame so that it may be stood on its bottom end 2 in rearwardly inclining position, said standard being inserted through a transverse central slit 7 in the back panel 1 to extend upwardly into the frame above said slit, and outwardly and downwardly of the frame from the slit to form a flexible leg for supporting the frame in a manner which will be understood. The standard 6 is crimped in the slot 7, as shown at 8, to interlock the same with the back panel 1 against slipping, the arrangement being such that said standard may be pulled out of the slit 7 and thus detached, if desired, when the frame is hung on a wall or the like.

The top and bottom ends 2, and the sides 3 of the frame are each formed by folding the piece of cardboard along its edges first forwardly to provide a forwardly extending flange 9, then inwardly to provide a front facing flange 10, and then outwardly of the frame to provide a tongue flange 11 spaced from and behind the facing flange 10 and narrower than the latter.

A mat is provided comprising in this instance a rectangular panel 12 appropriately die cut and of the proper size to fit between the flanges 9. The panel 12 in the embodied illustration is provided with a front inturned edge flange 13 around the same between which and the body of the panel 12 the tongue flanges 11 are inserted in the described folding operation so that the front panel 12 of the mat is interlocked with the tongue forming flanges 11. The flange 13 is formed by folding the outer edges of the panel 12 forwardly and inwardly and stitching adjacent the fold as at 14.

It will be seen that the inturned flange 13 with the panel 12 of the mat, or other means to which the flange is attached, forms for each of the tongue flanges 11 a narrow pocket groove for reception and anchorage of the respective locking tongue flanges 11. Then further it will be seen that the flange 13 and component inturned edge elements thereof, together with the mat or panel 12, constitute efficient reinforcing means for the entire frame including the back panel 1 and flap portions, including the flange portions 9, 10 and 11. The locking tongues or tongue flanges 11 are preferably of somewhat less length than the facing flanges 10 to facilitate folding of the flap portions and securing of the locking tongues. The mat 12 therefore, with its inturned edge flanges constitutes a combined tongue locking member and reinforcing medium for the entire frame, constructed throughout, of sheet material and hereafter in the appended claims, such structure or its mechanical equivalent may be referred to as a combined reinforcing and locking medium or as a tongue locking member constructed of sheet material.

As will be understood, the described mat is placed in the frame and the top and bottom ends 2 and sides 3 of said frame are then folded in the manner described, each separately.

Figure 2:
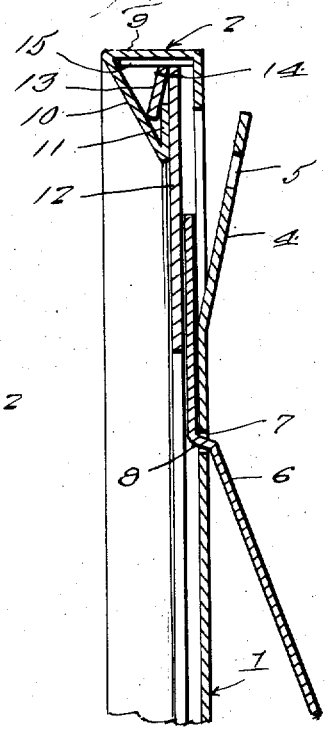
Figure 2 is a fragmentary view in vertical section taken on the line 2—2 of Figure 1 and drawn to an enlarged scale.
Figure 4:
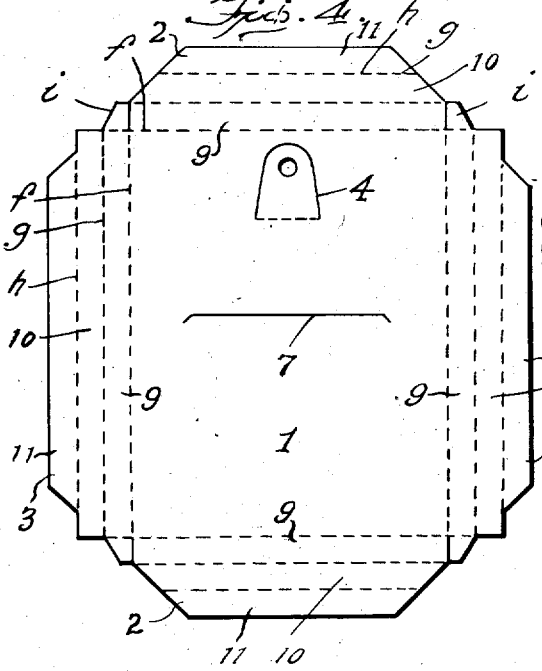
Figure 4 is a view of the blank from which the frame is formed.
Figure 3:
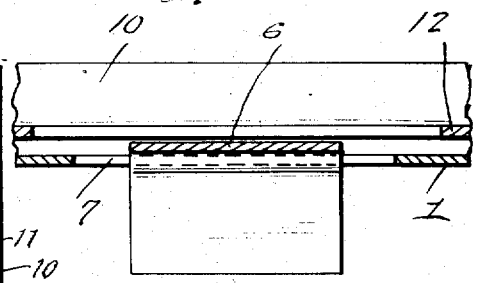
Figure 3 is a fragmentary view in transverse section taken on the line 3—3 of Figure 1 and drawn to an enlarged scale.

The described frame may be formed from a cardboard blank A such as shown in Figure 4, suitably cut at its corners to provide end and side flaps *b* and *c*, and slit in the body thereof, as at *d*, *e* to form the described tab 4 and slit 7. The flaps *b*, *c*, are designed to be folded along the dash lines *f*, *g*, *h* to form the described flanges 9, 10, 11. The said flaps *c* may be formed with narrow end tabs *i* for folding inwardly along the inner faces of the flanges 9, as indicated at 15 in Figure 2.

It will now be seen that my improved frame provides an inexpensive device which may be used for framing a picture without using mucilage or glue, and quickly assembled, and which when assembled securely holds the mat against slipping out of place, likewise a picture, and is strongly reinforced against warping or tearing.

The foregoing will, it is believed, suffice to impart a clear understanding of my invention, together with the manifold advantages thereof.

Although my invention has been set forth in specific terms and a single embodiment illustrated as exemplifying the same, it is to be understood that the right is herein reserved to changes in form, shape, and construction falling within the scope of the protection prayed.

What is claimed is:

1. A frame comprising a body constructed from foldable sheet material, said body having a main central portion constituting a back panel and having side and end flap portions extending from said central portion and folded upon themselves and each including an inturned front facing flange spaced outwardly, forwardly of one of the marginal edge portions of said back panel and including a locking-tongue flange folded from the outer extremity of each of said flap portions and extending backwardly from and behind said facing flange when the device is assembled and a combined reinforcing and locking medium constructed from sheet material positioned forwardly of said back panel and having an inwardly extending locking flange for each of said locking tongues, each extending parallel with one of the peripheral edges of said frame and being hidden behind said facing flanges and being adapted to receive and lock its related locking-tongue.

2. A frame constructed from foldable sheet material comprising a back panel having top, bottom and side portions folded upon themselves and each including a narrow forwardly extending flange, an inturned front facing flange angularly related with the body, of said back panel and a locking-tongue, forming flange, integral with said facing flange and spaced behind the same and a tongue-locking member constructed of sheet material positioned forwardly of the body of said back and having a plurality of inwardly extending tongue-locking flanges disposed behind and hidden by said front facing flanges and one being provided for each of said locking-tongues to receive and lock the same therebehind.

3. In a frame of the class described, a back panel having top, bottom and side portions folded upon themselves and each including a forwardly extending flange, an inturned angularly related front facing flange, and a tongue forming flange integral with the facing flange and spaced behind the same, and a mat fitting within the forwardly extending flanges and having an inturned surrounding edge flange overlying the tongue forming flanges between the same and the facing flanges whereby said mat is interlocked with said tongue forming flange.

4. In a frame of the class described, a back panel having top, bottom and side portions folded upon themselves and each including a forwardly extending flange, an inturned angularly related front facing flange, and a tongue forming flange integral with the facing flange and spaced behind the same, and a mat fitting within the forwardly extending flange and having an inturned surrounding edge flange overlying the tongue forming flanges between the same and the facing flanges whereby said mat is interlocked with said tongue forming flanges, the back panel of said frame having a transverse central slit therein, and a standard forming strip of cardboard inserted upwardly through said slit and crimped in the slit for supporting the frame in upright position.

HENRY S. PIPER.